April 4, 1944.    L. T. CONDE    2,345,963
CONDENSER CUP
Original Filed March 20, 1940
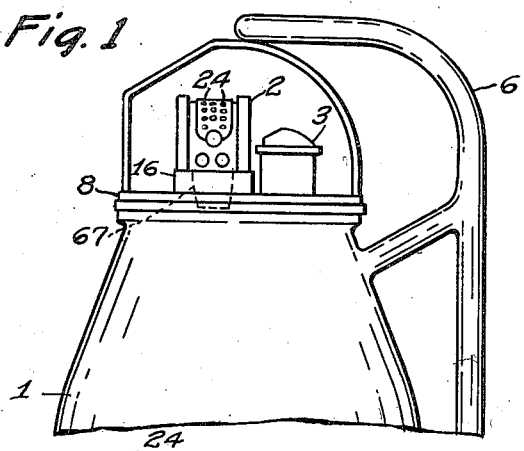
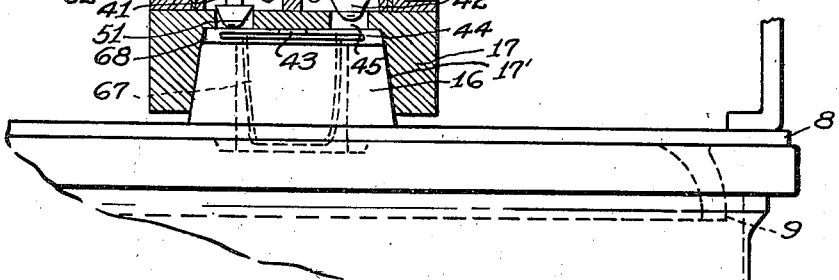
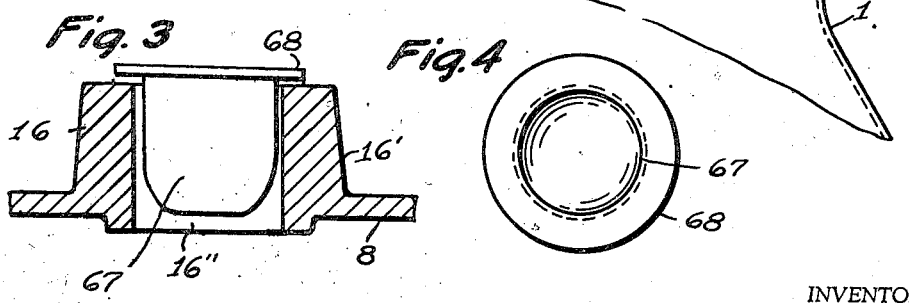
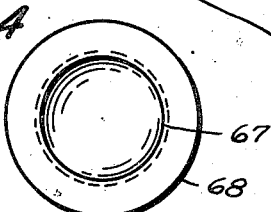
INVENTOR.
Lyall T. Conde
BY James Harrison Bowen
ATTY.

Patented Apr. 4, 1944

2,345,963

UNITED STATES PATENT OFFICE 2,345,963

CONDENSER CUP

Lyall T. Conde, Sherrill, N. Y.

Original application March 20, 1940, Serial No. 324,951. Divided and this application January 7, 1942, Serial No. 425,917

5 Claims. (Cl. 31—58)

The purpose of this invention is to provide means in breather connections of enclosed containers for arresting moisture and the like from vapors and also condensation passing therethrough.

This is a divisional application being divided from my copending application with the Serial Number 324,951, which was filed March 20, 1940, which has become Patent No. 2,340,454, issued Feb. 1, 1944.

The device is particularly adapted for milking machine pails and is located in the outlet connection under the pulsator where it arrests milk vapors and moisture endeavoring to pass from the pail to the pulsator.

The invention is a relatively thin flanged cup shaped device inserted in the air outlet passage in the cover of a milk pail and positioned so that incoming air of the pulsator swirls around on the inside of the device, and this air being cooler than the warm milk from the cow causes moisture in the air passing around the device to condense on the outer surface and this in combination with vapors from the milk which collect thereon and drop back into the pail.

All pipe line milking machines have had more or less trouble with moisture and milk vapor entering the pulsator, the operating mechanism, stanchion air tube, and pipe line. As the machine usually is used at least twice a day, the milk vapor is applied to these parts twice a day. Also as it is difficult to clean the inside of these parts they are not sterilized and this grows to be a very objectionable source of contamination. This condition has existed ever since the pipe line type of milking machine has been in use. Therefore, this condenser cup, which condenses the moisture suspended in the air, and milk vapors as they pass thereover has eliminated this condition and keeps the mechanism free from contamination, and also keeps the stanchion air tube and pipe line dry.

The object of this invention is therefore to keep moisture and milk vapors from the hot milk of milking machines from passing into the pulsator, the operating mechanism thereof, the stanchion air tube, and pipe line.

Another object is to provide a device for arresting moisture in fluids passing out of milk pails of milking machines which in itself requires no operating parts.

A further object is to provide a condenser cup for collecting moisture from fluids passing out of the outlet air passage of milk pails of milking machines which also functions as a check valve to prevent fluids passing back into the pail.

And a still further object is to provide a device for removing moisture from fluids passing out of an outlet air passage of milk pails which is of a simple and economical construction.

With these ends in view the invention embodies a cup shaped receptacle preferably of relativly thin metal with an outwardly extending flange around the upper end, and positioned in an opening in the cover of a milk pail of a milking machine with the flange resting on the cover at the upper end of the opening and with the inside diameter of the said opening slightly larger than the outside diameter of the device.

Other features and advantages of the invention will appear from the following description taken in connection with the drawing, wherein:

Figure 1 shows a side elevation of a milking machine with parts omitted and with the condenser cup shown in dotted lines.

Figure 2 is a detail showing a part of the upper end of the milking machine on a larger scale.

Figure 3 is a detail showing a section through the cup and mounting therefor in the cover of the milk pail.

Figure 4 is a plan view of the cup.

In the milking machine illustrated in the drawing, 1 is the milk pail, 2 the pulsator, 3 the spigot and 6 a handle for the pail. The pail is provided with a cover 8 having a downwardly extending flange 9 locating and centering it on the pail. A boss 16 is provided on the cover 8 and extends upwardly from the top surface thereof. This boss is of fairly substantial dimensions, and is preferably formed with a sloping or tapered outer surface 16' and has an opening or passage 16" therethrough, which opening extends through the cover to afford communication with the interior of the pail when the cover is in position thereon.

The pulsator 2 is formed or provided with a base member 17 which is substantially in the form of an inverted cup having a sloping or tapered inner surface 17' corresponding with the similarly shaped outer surface 16" on the boss 16 so that it fits tightly thereover, as shown in Fig. 2, leaving a space between the top of the boss 16 and the opposed bottom surface of the base member 17. The pulsator 2 is provided with two diaphragms 21 and 22 and also with an air inlet formed by the perforations 24 in the cover thereof. Furthermore, the pulsator is provided with two valve constructions 41 and 42 for controlling flow through ports, as described later.

The base member 17 of the pulsator is provided with a port or passage 43 that communicates with the space or area 44 between the top surface of the boss 16 and the opposed bottom surface of the base member 17. This port or passage is adapted to be connected to a vacuum source whereby the normal atmospheric pressure below the valves 41 and 42 may be reduced to subatmospheric pressure. The area above the valves is subject to air at atmospheric pressure. In one position during operation, the valve 42 closes the port 45 leading to the space or area 44, while leaving open the port 46, which leads to the atmosphere through the perforations 24 in the cover of the pulsator. In the opposite position, valve 42 closes the port 46 while leaving open the port 45. Likewise, in one position, the valve 41 closes the port 51 leading to the space or area 44, while leaving open port 50, which leads to atmosphere by means of the perforations 24 in the cover of the pulsator. In the opposite position, the valve 41 closes the port 50 while leaving open the port 51. The alternate operation of these valves is effected as described in applicant's co-pending application, Serial No. 324,951.

The ports or passages 45 and 46 communicate with chest or chamber 61, while ports or passages 50 and 51 communicate with chest or chamber 62, so that each chest or chamber has communication with atmospheric pressure and also a vacuum source. These chests or chambers are provided with nipples 63 and 64 extending therefrom. The operation of the valves 41 and 42, as above described, is such that initially, one chest is opened to atmospheric pressure while the other chest is opened to a vacuum source, and, then, said first chest is opened to a vacuum source while said other chest is opened to atmospheric pressure. This alternate operation is repeated while the machine is functioning. As a result, there is a steady flow of air to the vacuum port or passage 43, through one or the other of the ports 45 and 51.

A thin walled cup 67 of metal or any suitable material and of any suitable design, shape or size, is positioned below the pulsator 2. It is loosely supported in and by the boss 16 by means of the annular flange 68 which rests on the upper surface of the boss. The body of the cup is less in diameter than the diameter of the opening or passage 16" in the boss so that the cup is spaced from the wall of said port or passage.

During the operation of the milking machine, the upper surface of the cup 67 is subjected to sub-atmospheric pressure due to the vacuum connection with the space or area 44, so that the cup moves upwardly a sufficient distance to provide clearance between the flange 68 and the top surface of the boss 16. The warm air and vapor from the inside of the pail and its contents naturally rise and flow out through the boss opening 16" around the cup due to the subatmospheric pressure in the space or area 44. The cup is cooled by contact therewith of the atmospheric air flowing through the space or area 44 and therefore remains substantially at atmospheric temperature. The air and vapors passing around the cup are substantially at the body temperature of the cow being milked, and, therefore, are at a higher temperature than the temperature of the cup. As a result, moisture in the upwardly moving gaseous current flowing around the cup is sufficiently reduced in temperature to condense, and either deposit on the outer surface of the cup and subsequently drop back into the pail, or to drop back directly into the pail.

This condenser cup 67 also functions as a check valve to prevent the air passing from the pulsator (as the valves thereof open) downward into the milk pail. It also receives moisture that may be suspended in this air which collects by condensation on the interior of the pulsator above the condenser cup. When functioning as a check valve, the cup 67 is seated upon the upper end of the bushing or boss, and when permitting the air and vapors to pass out of the pail it is slightly elevated as shown in Figure 2.

It will be understood that changes may be made in any of the parts without departing from the spirit of the invention. One of which changes may be in the use of other means for mounting the condenser cup in the milk pail, another may be in the use of other means for cooling the surface of the cup, and still another may be in the use of this condenser cup or of a similar cup, in a milking machine or other device of any other type or for any purpose.

The construction will be readily understood from the foregoing description. In use the condenser cup is freely positioned in the cover of the pail of a milking machine below the pulsator and as the walls are of relatively thin metal or other suitable material they are cooled by the air coming out of the pulsator as the valves thereof open and this moves with a swirling action downward into the condenser cup as it passes toward the pipe line, and this air being cooler than that inside of the pail or under the cover where the warm milk is flowing, causes this condenser action.

Having thus fully described the invention what I claim as new and desire to secure by Letters Patent, is:

1. A milking machine comprising a pail having a cover, a pulsator on said cover having an area through which air passes from atmosphere to a vacuum source, a vertical passage in said pail cover communicating with said area, a cup-shaped member arranged in said passage with its under surface adapted to be contacted by gaseous media flowing through said passage toward said area, and its upper surface adapted to be contacted by air flowing through said area, and a flange on said member limiting downward movement thereof into said passage while permitting free upward movement thereof.

2. A milking machine comprising a pail having a cover, a pulsator on said cover having an area through which air passes from atmosphere to a vacuum source, a vertical passage in said pail cover communicating with said area, a cup-shaped member arranged in said passage with its under surface adapted to be contacted by gaseous media flowing through said passage toward said area and its upper surface adapted to be contacted by air flowing through said area, and means limiting downward movement of said member into said passage while permitting free upward movement thereof.

3. A milking machine according to claim 1 characterized by said cup-shaped member being composed of thin metal and being of slightly less diameter than said passage.

4. A milking machine according to claim 2 characterized by said cup-shaped member being composed of thin metal and being of slightly less diameter than said passage.

5. The combination in a milking machine, of a pail, a cover therefor, said cover being provided with a boss on top thereof having an opening or passage extending through the boss and cover to afford communication with the contents of said pail when the cover is on the pail, a pulsator positioned on said cover and having a base member fitting upon said boss with a space between the top surface of said boss and the opposed bottom surface of said base member, said space being adapted to be connected to a vacuum source, a cup-shaped member positioned within said opening or passage in said boss, the body of said cup-shaped member being less in diameter than the diameter of the opening or passage in the boss, said cup-shaped member having an annular flange at the top thereof which is adapted to rest on the top surface of the boss, whereby said cup-shaped member has free upward movement with respect to said port or passage but limited downward movement due to the engagement of said flange with the top surface of said boss.

LYALL T. CONDE.